US006706965B2

(12) United States Patent
Kato et al.

(10) Patent No.: US 6,706,965 B2
(45) Date of Patent: Mar. 16, 2004

(54) DEVICE FOR DETERRING CABLE DISPLACEMENT

(75) Inventors: Junichi Kato, Sunnyvale, CA (US); Renato Ravanello, Saratoga, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/078,312

(22) Filed: Feb. 15, 2002

(65) Prior Publication Data

US 2003/0155150 A1 Aug. 21, 2003

(51) Int. Cl.[7] .......................... H01B 7/34; H02G 15/02; H01R 4/00

(52) U.S. Cl. ......................... 174/36; 174/74 R; 174/79; 174/82; 174/84 R; 174/85

(58) Field of Search ................................ 174/36, 74 R, 174/75 R, 77 R, 79, 82, 84 R, 85, 92, 110 SR, 110 AR, 110 R

(56) References Cited

U.S. PATENT DOCUMENTS 4,140,918 A * 2/1979 Lancaster ................... 307/112
4,538,875 A * 9/1985 Krenz ......................... 439/470
5,070,597 A * 12/1991 Holt et al. ..................... 29/887
5,783,778 A * 7/1998 Foss et al. ................ 174/77 R

* cited by examiner

*Primary Examiner*—William H. Mayo, III

(57) ABSTRACT

A device for deterring displacement of a cable is effectuated in an embodiment of the invention by an enclosure that envelopes the cable and an affixing mechanism that couples the enclosure to the cable, where the cable is oriented in an assembly such that the enclosure contacts a feature internal to the assembly and deters displacement of the cable.

17 Claims, 13 Drawing Sheets

DEVICE FOR DETERRING CABLE DISPLACEMENT

BACKGROUND OF THE INVENTION

1. Field of the Invention

Embodiments of the present invention relate to the field of cable construction. Specifically, embodiments of the present invention relate to a device for deterring cable displacement.

2. Related Art

Cable assemblies are common in a wide spectrum of electrical interconnection applications. Such applications include routing of signals between modules and systems within integrated electronic platforms and chassis. This application is especially widespread in larger platforms such as multi-chassis rack mounted assemblages, an architecture typical of larger computers such as Web and DBMS servers, communications equipment, instrumentation and control panels, and the like.

Exponents of this architecture are routinely designed for compliance with a host of engineering practices and standards. Movement, vibration, and shock are some of the factors taken into account in their mechanical design for reliability. This is helpful, considering that many such assemblages may be designed for portability and transportability, including use while in motion. Further, even equipment designed for stationary mounting and use may be subject to these factors from seismic activity. Thus, even such equipment is also designed with these factors in mind.

Shock and vibration testing is a common modern engineering test practice to verify design intent. They are perhaps one of the more rigorous sources of such phenomena such assemblages may ever encounter. Thus, these assemblages, including that of their electrical terminals and connectors, must be designed to withstand rigorous shock and vibration testing, to certify their compliance to engineering and quality standards, as well as to assure ability to cope with such phenomena in situ.

Peripheral component interconnect (PCI) cards and other printed circuit boards (PCB) in such assemblages are commonly connected to parallel-lying slots, and, in certain applications, are kept separated one from the other in movement, shock, and vibration conditions with electrically insulating planar spacers, such as On-Line Replacement (OLx) dividers. Cables routed within such assemblages are routed in such ways as to minimize their displacement under movement, shock, and vibration conditions.

Cables are typically terminated via their plugs, receptacles, and other such electromechanical appliances installed on each of its ends. These terminals electromechanically couple to complimentary plugs and receptacles installed on components, stages, and/or modules, etc., within the assemblage. This complimentary electromechanical coupling effectuates two useful features.

First, it enables the cables to electrically interconnect components, stages, and/or modules, etc., within the assemblage. For example, a PCI and a module backplane may be electrically coupled via their own accessible receptacles, through a cable and complimentary plugs and receptacles installed on each end thereof. Second, the electromechanical coupling mechanically holds the cable end in place where it is terminated, preventing the electrical intercoupling there from disconnecting inadvertently.

To effectuate the feature of mechanically securing the cable termination, the movement, shock, and vibration design considerations are important. Thus, conventionally, cables terminals are often designed to incorporate lock-on mechanisms of some type. With reference to Prior Art FIG. 1, one common technique to secure the termination of a cable 1C is the use of screw in fasteners, such as a threaded female receptacle 1S on the stationary terminal and a complementary male screw 2M on the cable end. Another common conventional design is a clip 3S on another stationary end, and a complementary clip holder 4M on the cable end.

In some instances however, such lock-on mechanisms may be unavailable. In certain circumstances, this unavailability may be especially likely. For example, in test runs, field repairs, and emergency situations, impromptu cable repairs may be desirable, even necessary, but complementary termination locking hardware may be absent from the parts at hand. Cables terminated under such conditions may lack lockdowns.

Also, when PCIs are added or replaced, off the shelf PCIs frequently have no fasteners available; such boards are simpler and frequently less expensive than boards with such hardware mounted. In some applications, such boards are preferred for another reason; absence of cable locking hardware offers a lower profile and better clearance volume. Thus, cables may lack or lose their lockdowns for the sake of terminals taking up less space.

For a cable lacking terminal securing locking hardware, another conventional technique is illustrated in Prior Art FIG. 2. In this technique, a cable 2C is routed beneath a top cover TC and over the top edges of a set of insulating Olx dividers 202 and 204 to minimize the distance and nonlinearity of its routing path. Cable 2C is terminated by the unlocked electromechanical mating of its own terminating connector 5M and the stationary connector 6S on a PCI board PC2. However, this solution may prove inadequate under significant shock and vibration conditions, as an assemblage may experience under shock and vibration testing and/or in situ.

When shock and vibration testing is applied to assemblages with a cable connected lacking termination fasteners, or when such assemblages are subjected to similar perturbances in situ, it is possible that one or both of the cable terminations may fail under the corresponding stresses and strains. This may be an especially likely danger where the cable's own length is displaced within the assemblage by movement caused by horizontal, vertical, and torsional forces imposed upon it.

Mechanical failure, e.g., disconnection, of the termination may cause the cable terminal to break free from the complimentary receptacle to which it is coupled. Such disconnections result in electrical decoupling, with corresponding interruption of signals, control, power, and communications flow, and related, incidental and consequential failures, including system shutdowns, crashes, etc.

Hence, conventional cable assemblies are often susceptible to damage or disconnection due to mechanical movement, shock, and/or vibration, especially when employed without a terminating fastener.

SUMMARY OF THE INVENTION

A device for deterring displacement of a cable is effectuated in an embodiment of the invention by an enclosure adapted to envelope the cable and an affixing mechanism adapted to couple the enclosure to the cable. The cable is oriented in an assembly such that the enclosure contacts a feature internal to the assembly and deters displacement of the cable.

BRIEF DESCRIPTION OF THE DRAWINGS

Prior Art

Prior Art

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail so as not to unnecessarily obscure aspects of the present invention.

For a cable having an outer jacket, a method for deterring displacement of the cable is effectuated by enveloping the outer jacket by an enclosure and routing the cable such that the enclosure abuts the edges of a divider or a component. In one embodiment, a method for deterring displacement of the cable is achieved by a system effectuated by a enveloping instrumentality, mechanism, or other effective means. One embodiment effectuates a device operable for deterring displacement of a cable. Other embodiments effectuate devices operable for deterring displacement of a cable in an assemblage, such as a computer, server, instrumentation and/or control rack or panel, or other electronic apparatus and/or machine.

Figure 8:
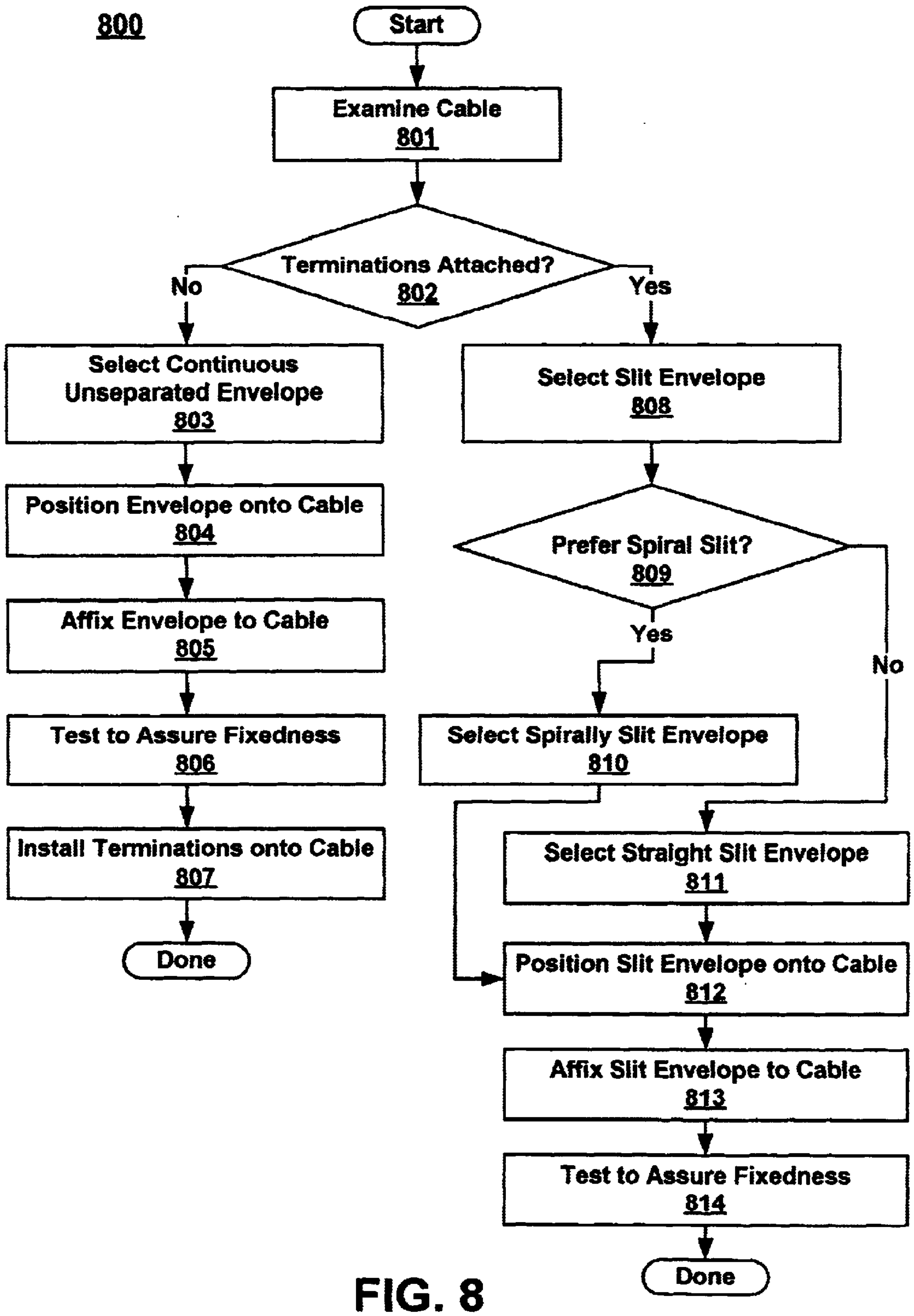
FIG. 8 is a flowchart of the steps in a process for preparing a cable for deterrence of displacement, in accordance with an embodiment of the present invention.
Figure 9:
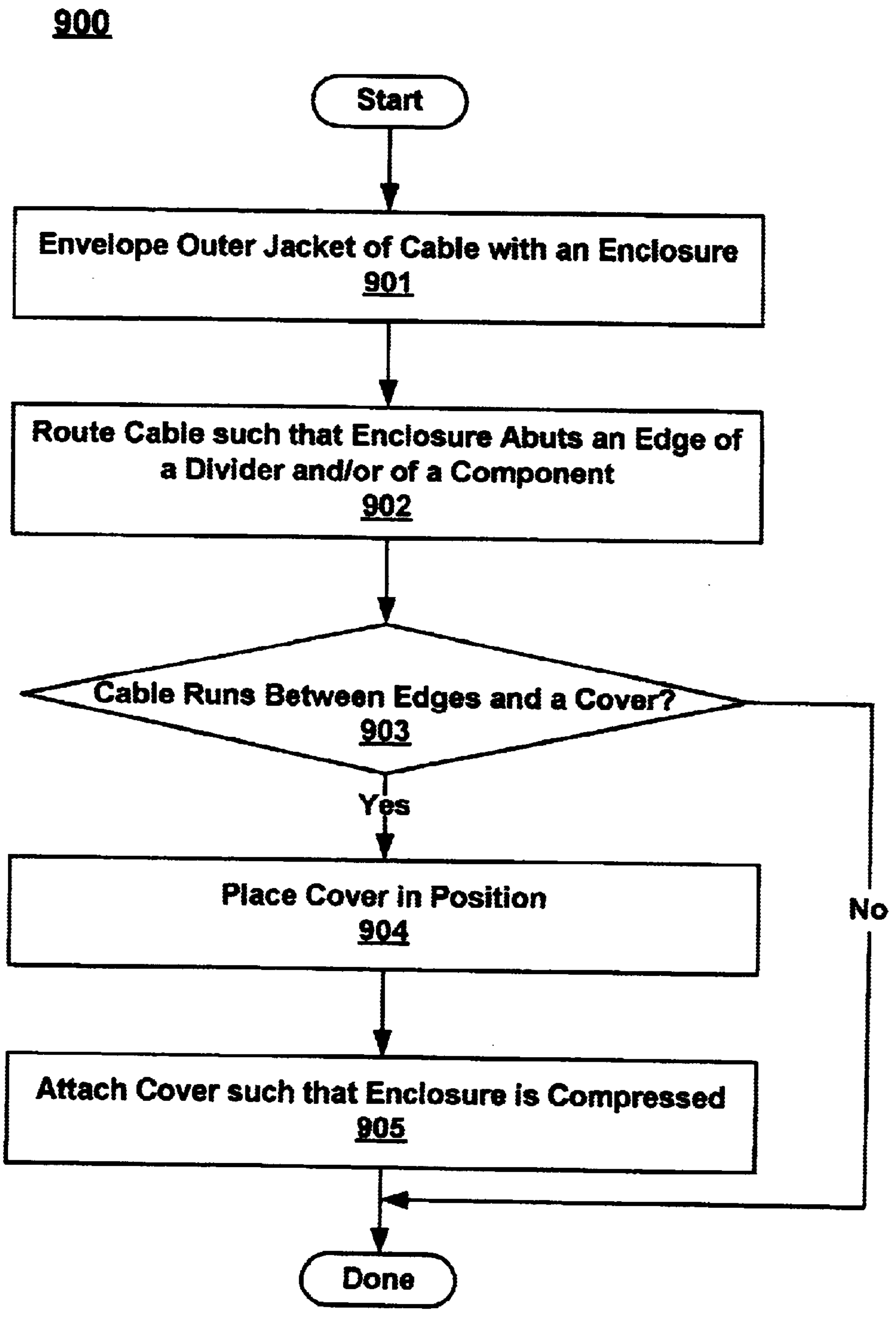
FIG. 9 is a flowchart of the steps in a process for deterring cable displacement, in accordance with an embodiment of the present invention.

Certain portions of the detailed descriptions of embodiments of the invention, which follow, are presented in terms of processes and methods (e.g., processes 800 and 900 of FIGS. 8 and 9; respectively, etc.). Although specific steps are disclosed in such figures herein describing the operations of these processes and methods, such steps are exemplary. That is, embodiments of the present invention are well suited to performing various other steps or variations of the steps recited in the flowcharts of the figures herein.

Embodiments of the present invention are discussed primarily in the context of a method, system, and devices for deterring displacement of a cable.

Figure 1:
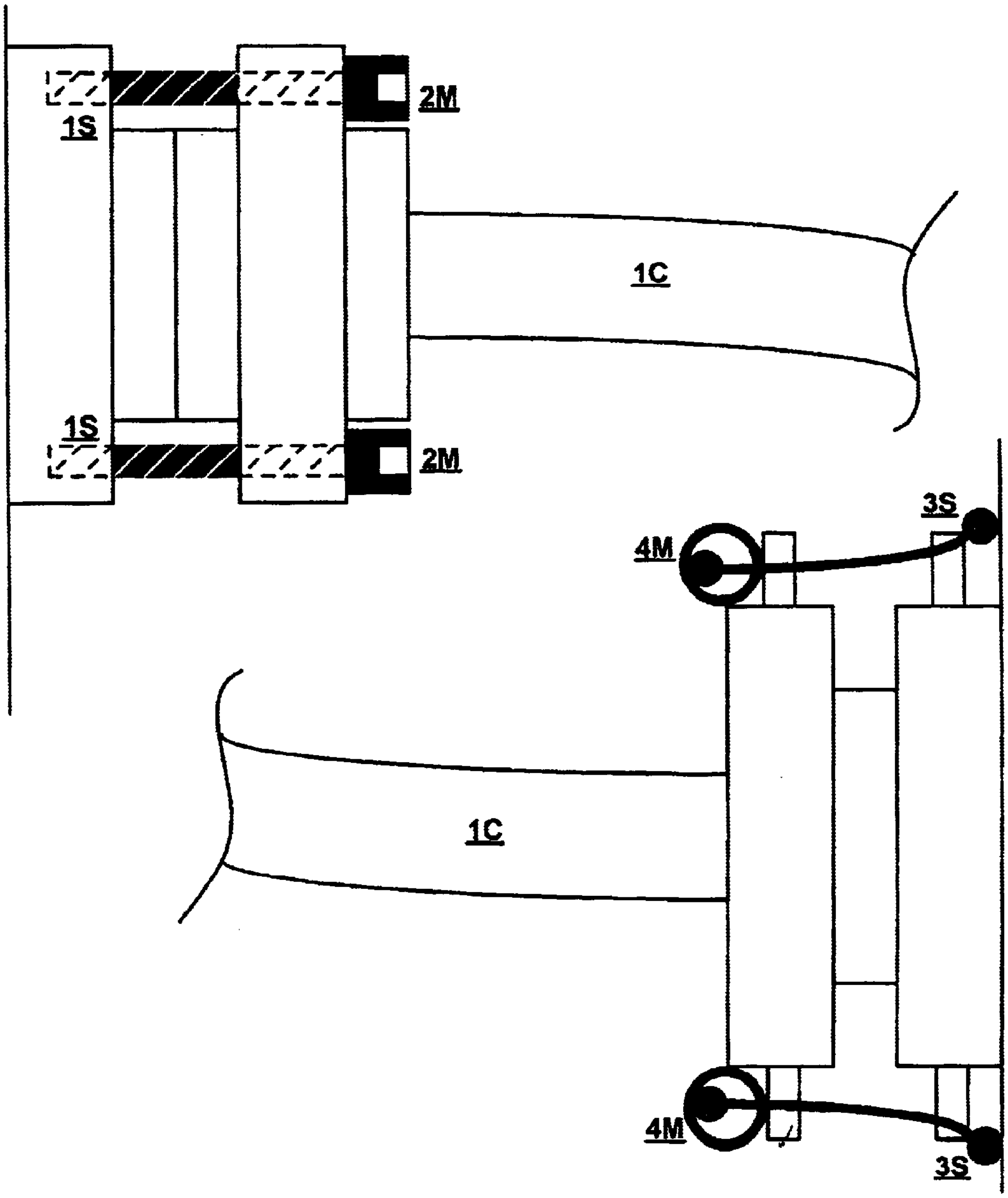
FIG. 1 (Prior Art)
FIG. 1 is a schematic diagram of a pair of conventional locking cable terminations.
Figure 2:
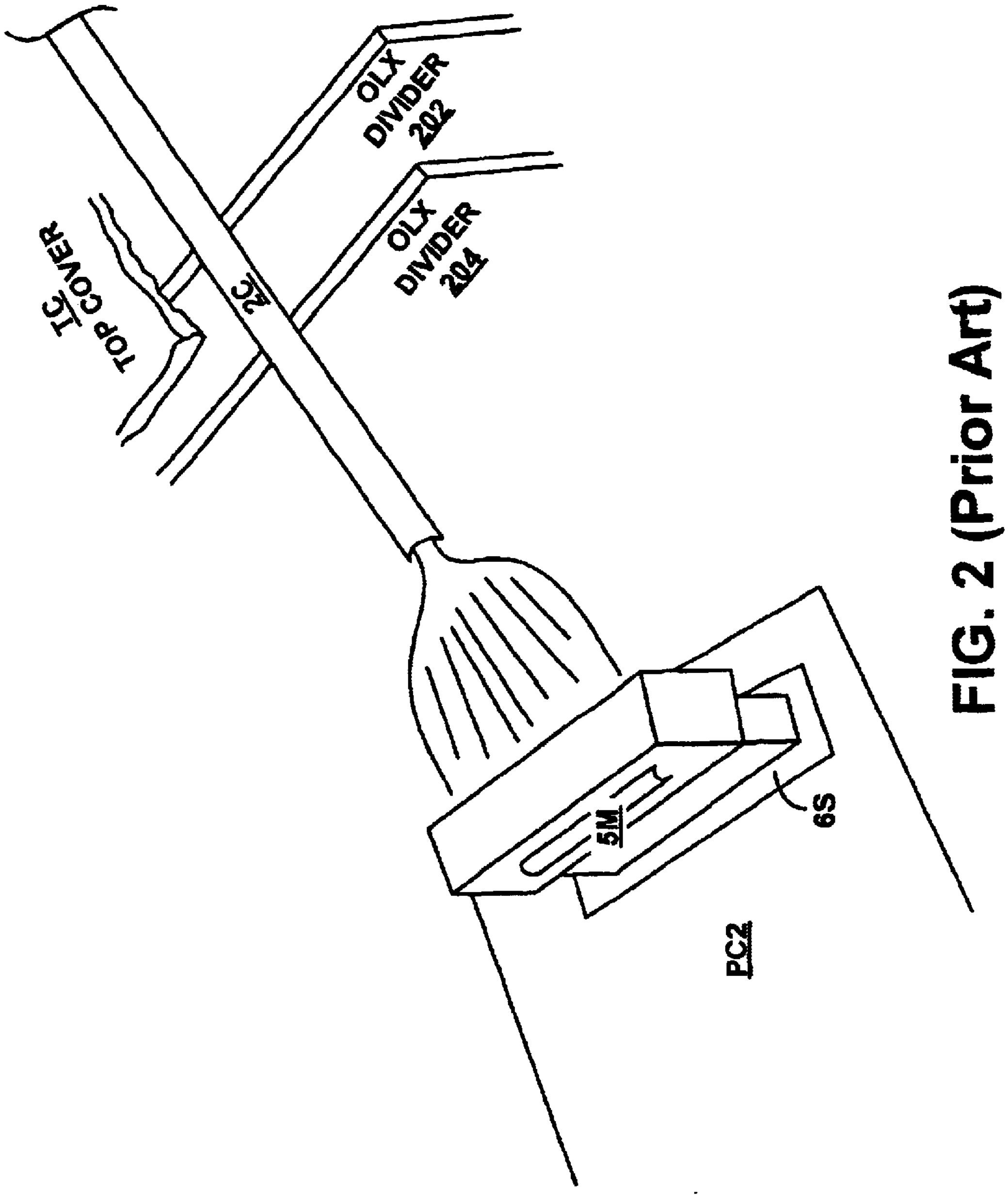
FIG. 2 (Prior Art)
FIG. 2 depicts a conventional cable routing scheme.
Figure 3A:
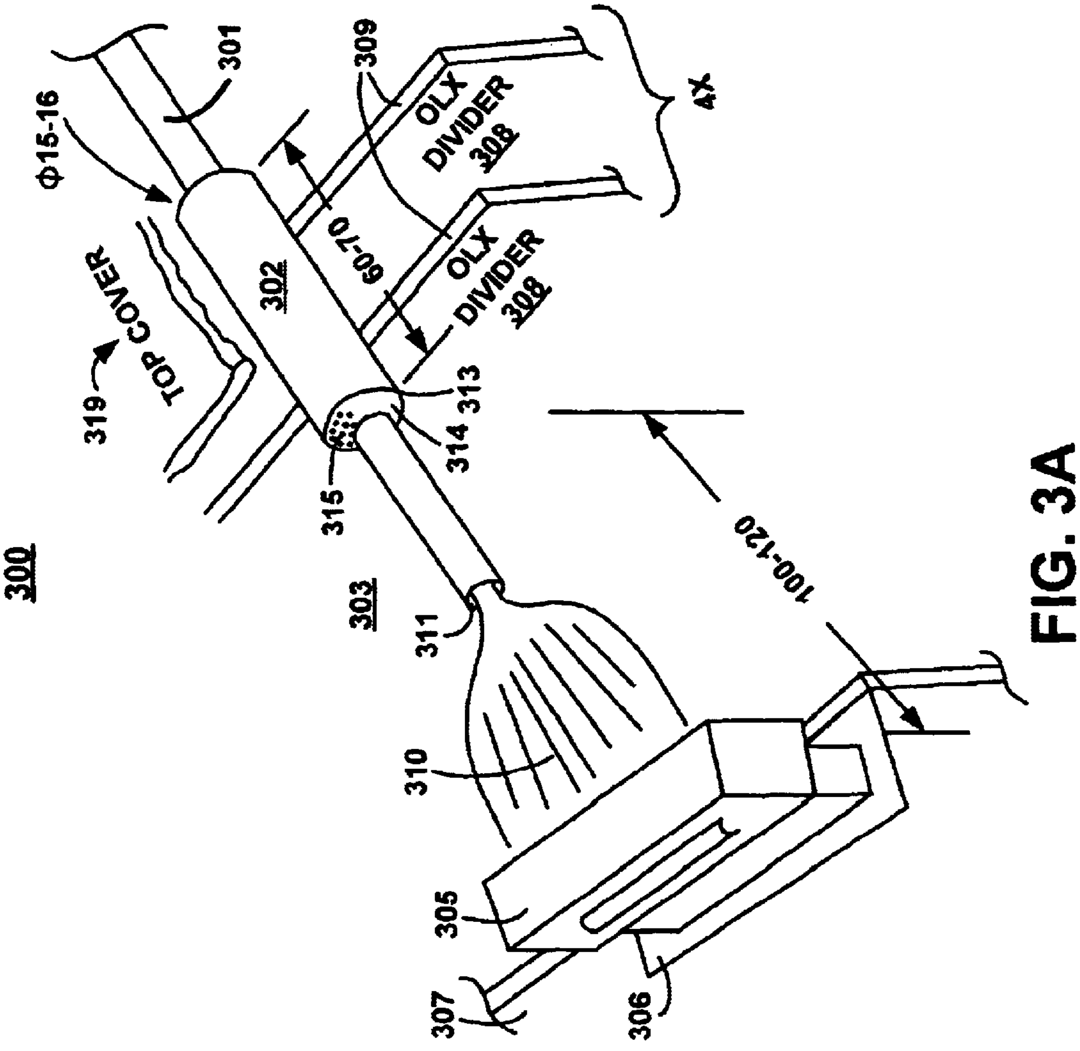
FIGS. 3A, 3B, and 3C depict a sleeve device and cable routing scheme from different perspectives, in accordance with an embodiment of the present invention.
Figure 3B:
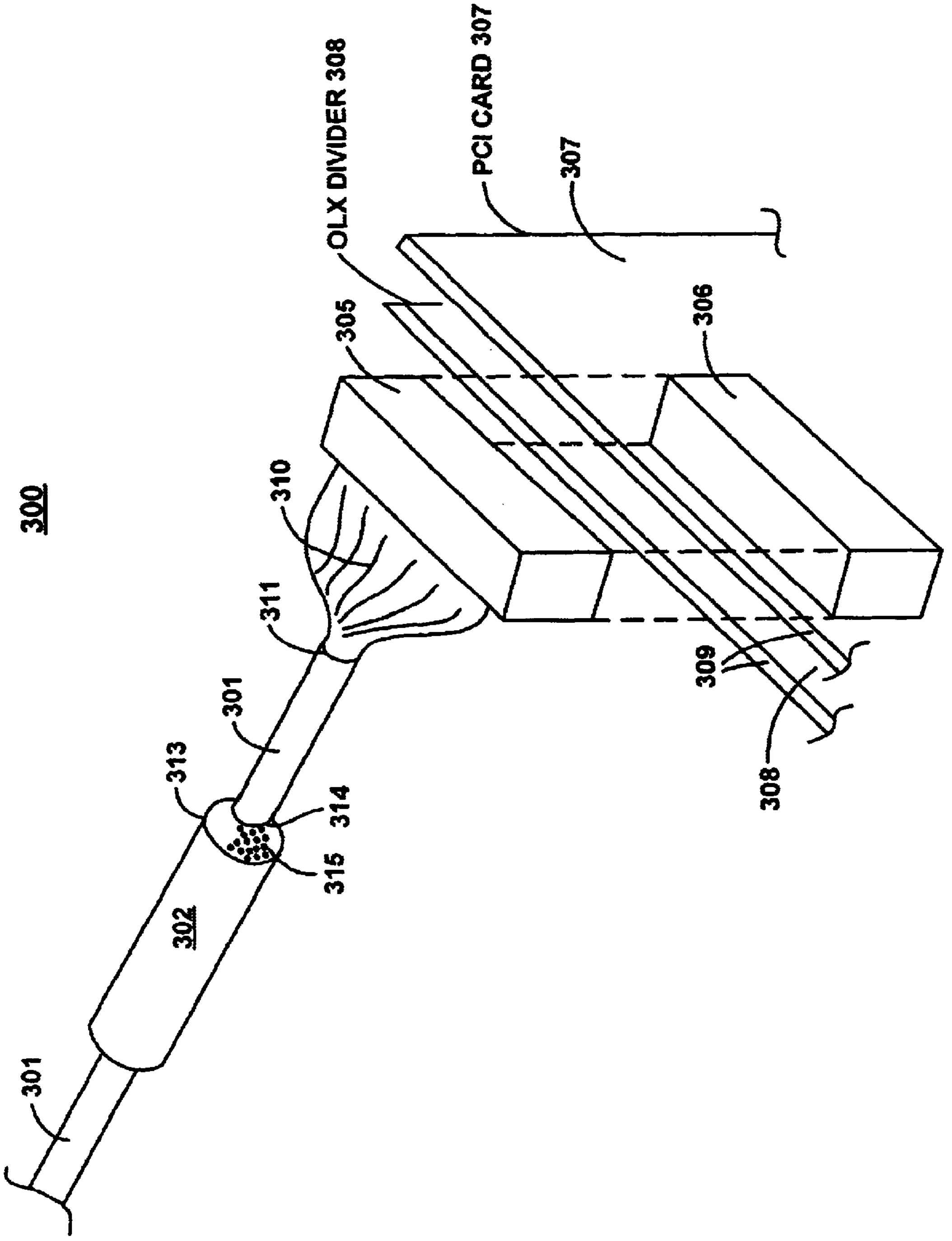
Figure 3C:
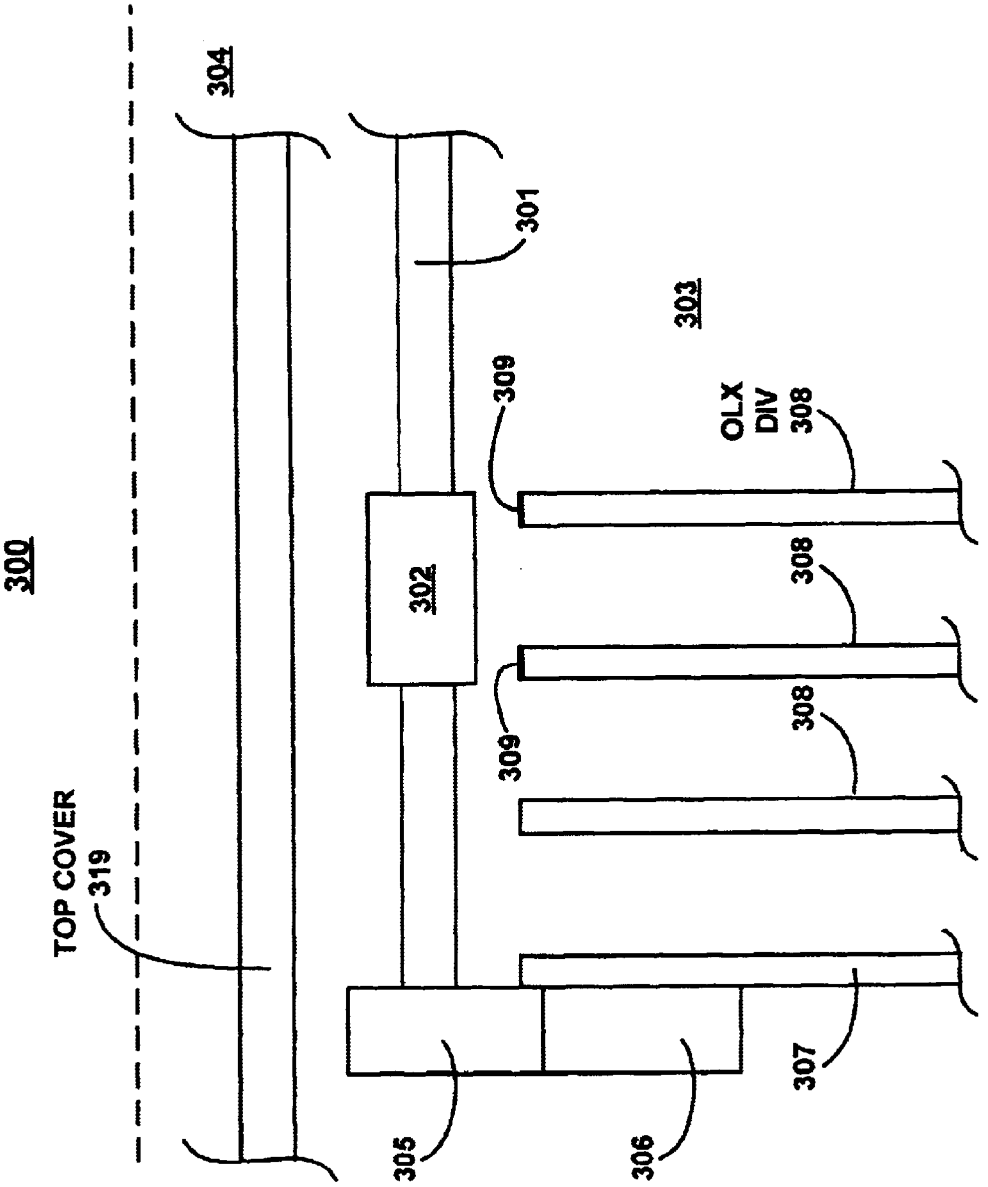

With reference to FIGS. 3A, 3B, and 3C, a system 300 is depicted from different perspectives. System 300 deploys means to deter displacement of a cable, especially under conditions of movement, shock, and/or vibration, according to an embodiment of the present invention. A cable 301 is routed through the internals of a module 303 of an assemblage 304. A top cover 319 covers module 303.

In the present embodiment, assemblage 304 is a rack or cabinet mounted electronic assemblage, such as a computer, a server, a communications equipment bay, an electrical control panel, a process control panel, an instrumentation and control panel, a medical or laboratory instrumentation panel, etc., or the like. Module 303 is a module within assemblage 304, housing, for example, certain PCI and other circuit boards, systems, subsystems, etc. or the like.

Cable 301 is routed through module 303, in the present embodiment, interconnecting submodules within. The part of cable 301 not shown for example, may run to a connection on the backplane of a submodular component in another part of module 303, not shown. However, the part visible in FIG. 3 terminates via a connector 305 to a receptacle connector 306 on a submodular PCI 307. A fanlike array 310 of smaller, individually insulated conductor bearing wires or fiber optic channels emerges from an outer jacket 311 of cable 301 to terminate at terminal connector 305. Although such a configuration of cable 301 is shown in FIGS. 3A, 3B, and 3C, the present invention is well suited to be practiced with a cable configured in a different manner.

Receptacle connector 306 and connector 305 form an electrical (or optical) interconnection mechanically secured only by the mechanical pressure of their insulating structures pressing or rubbing together, or otherwise forming a contact, as well as similar forces exerted by their electrically conducting interconnecting parts, such as pins and sockets, blades and fingers, etc. No securing hardware, such as screws and clips and complementary receptacles, are deployed.

Module 303 has running through a part of itself an array of substantially parallel plug in submodular PCI receptacles, e.g., slots along a floorplane below, not shown. Further, an array of insulating dividers such as Olx dividers 308 separate PCIs plugged into these slots, to electrically insulate their exposed components and traces one from the other during hot installation and/or removal and movement, shock, and vibration conditions. OLx dividers 308 are secured, in slots or otherwise, in an array substantially parallel to each other. In the present embodiment, there are two Olx dividers 308 shown.

Cable 301 is routed in the present embodiment through module 303 such that a run of its length lies crossing edges 309 of Olx dividers 308. It is appreciated that, in another embodiment, cable 301 could just as well so traverse the edges of parallel PCIs plugged in, positioned and secured in the manner of Olx dividers 308 herein, and in one embodiment, actually insulated each from the other by Olx dividers 308.

Along the length of cable 301 traversing Olx dividers 308 in the present embodiment depicted in FIG. 3, a sleeve 302 envelopes the outer jacket 311. Sleeve 302, in the present embodiment, and the portion of cable 301 it envelopes ranges from 60–70 millimeter (mm) of the length of cable 301, and sleeve 302 is 15–16 mm in outer diameter. Although such dimensions are explicitly recited in regard to the present embodiment, the present invention is well suited to be practiced with other dimensions.

Figure 4:
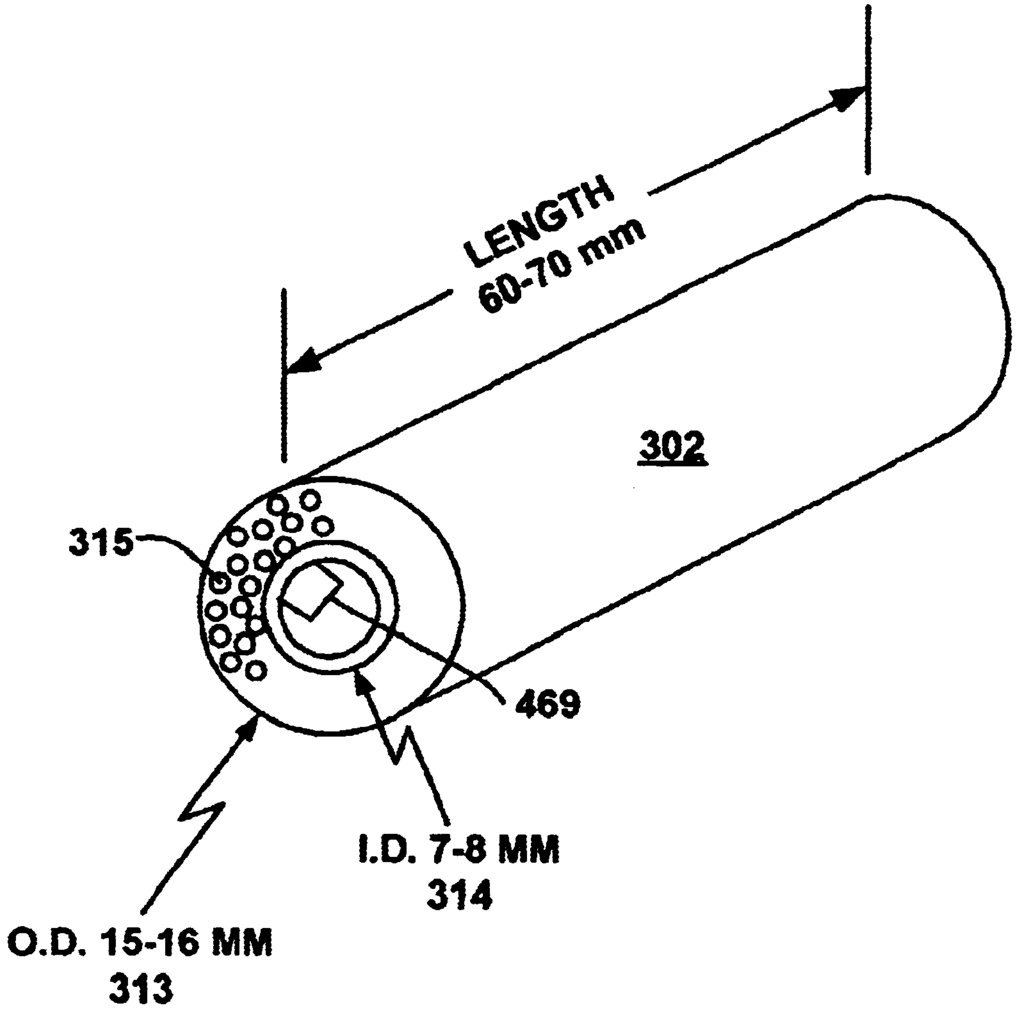
FIG. 4 depicts a unitary, uninterrupted compressible cable sleeve, in accordance with an embodiment of the present invention.

With reference to FIG. 4, a sleeve 302 of one embodiment is depicted. Sleeve 302 in the present embodiment is also 60–70 mm long, with an inner diameter of 7–8 mm and an outer diameter of 15–16 mm. An inner jacket 314 and an outer jacket 313 define a substantially cylindrical contour for sleeve 302. This substantially cylindrical contour has two co-annular subcylinders, an inner cylindrical surface defined by inner jacket 314 and an outer cylindrical surface defined by outer jacket 313.

Sleeve 302, in one embodiment, has a solid, tough, rather smooth outer jacket 313. In one embodiment, a similar inner jacket 314 makes contact between sleeve 302 and cable 301. Between outer jacket 313 and inner jacket 314, sleeve 302 is a foam material 315 having a substantially cellular consistency. Material 315 may have, in alternative embodiments, either a closed or dense cell foam structure, or various other material structures. In other embodiments, material 315 may be a hard plastic, a metallic spring, or a metallic mesh material.

In one embodiment, all constituents of sleeve 302 are electrically insulating. In one embodiment, there is no inner jacket, and material 315 comes in direct contact with outer jacket 311 of cable 301. Sleeve 302 is affixed to outer jacket 311 of cable 301 by a glue complementary to both jackets, thermosetting, natural inter-adhesion, frictional coupling, etc. In one embodiment, an affixing mechanism 469 is effectuated by glue, thermosetting, complementary adhesion between said enclosure and said outer jacket, friction, resilient shape retention, and compression.

Inner and outer jackets 314 and 313, respectively, bound the inner and outer contours of a foam filling 315, having a substantially cellular structure of either a closed or dense foam constitution. It is appreciated that in one embodiment, the inner surface of sleeve 302 has no inner jacket, but rather an inner substantially cylindrical surface defined by the foam 315, itself.

Material 315, in one embodiment, is a polymeric foam material, such as urethane, neoprene, silicone, etc. It is appreciated that other embodiments may use other application-specific materials. Typical foams used in some embodiments have a density of approximately 1 pound per cubic foot. However, it is appreciated that foam densities from one half pound per cubic foot to one and one half pounds per cubic foot are adequate for many applications, and in some others, denser and/or less dense foams may be used. Hence, other embodiments may use different densities, accordingly.

It is appreciated that for many electronic applications, insulating materials must meet certain flammability specifications, promulgated by various engineering standards and/or safety codes. In the present embodiment, a foam is selected that complies with or exceeds the HF-2 flammability rating promulgated by Underwriters' Laboratories (UL) of Northbrook, Ill. Other embodiments may deploy foam sleeves compliant with this and/or other flammability ratings, as required.

It is appreciated that sleeve 302 may be installed upon a cable (e.g., cable 301; FIG. 3) prior to installation of terminating connectors (e.g., terminal 305; FIGS. 3A, 3B, 3C). In alternative embodiments, a sleeve may be installed upon such a cable, even after installation of terminators.

Figure 5:
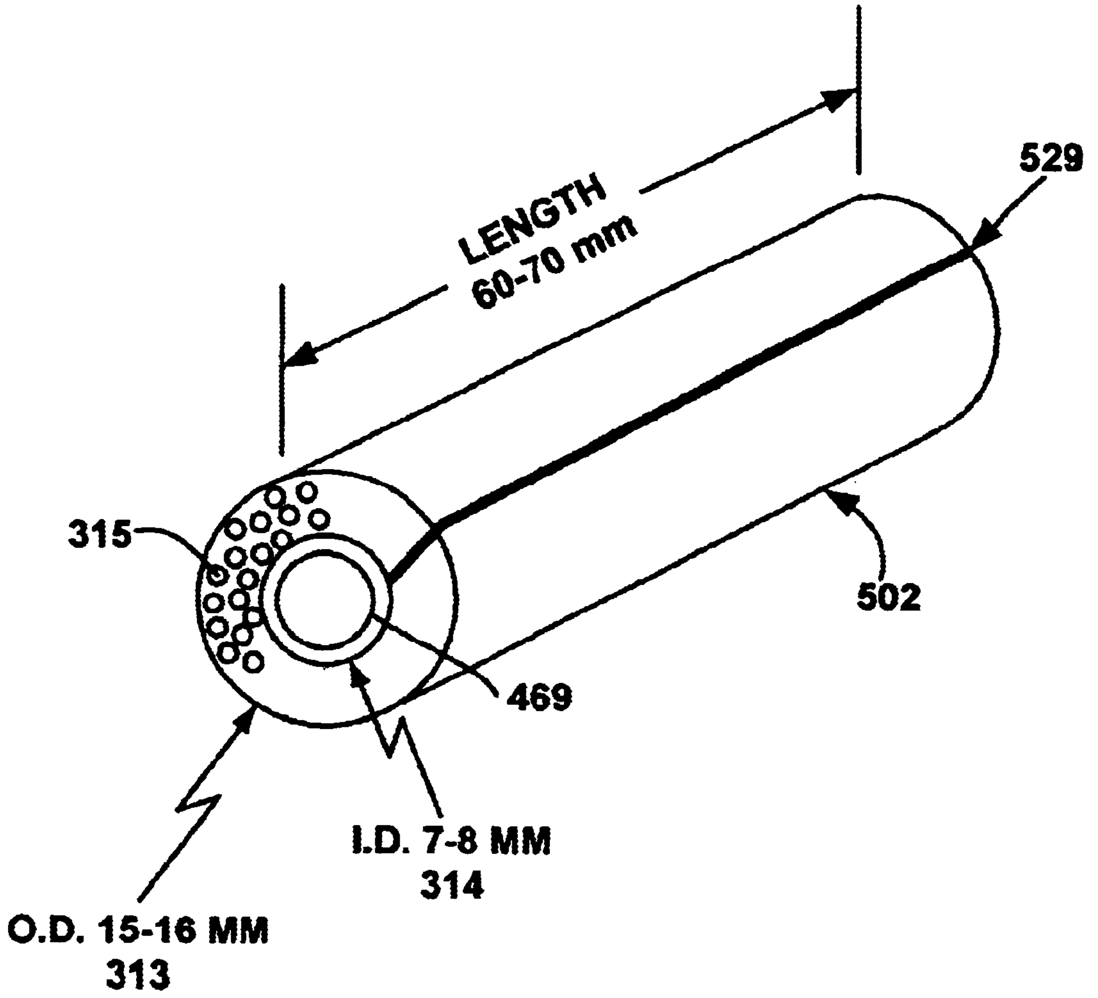
FIG. 5 depicts a unitary compressible cable sleeve with a longitudinally cut slit, in accordance with an embodiment of the present invention.

With reference to FIG. 5, a sleeve 502 bears a straight slit 529 cut linearly through outer jacket 313, foam 315, and inner jacket 314.

Figure 6:
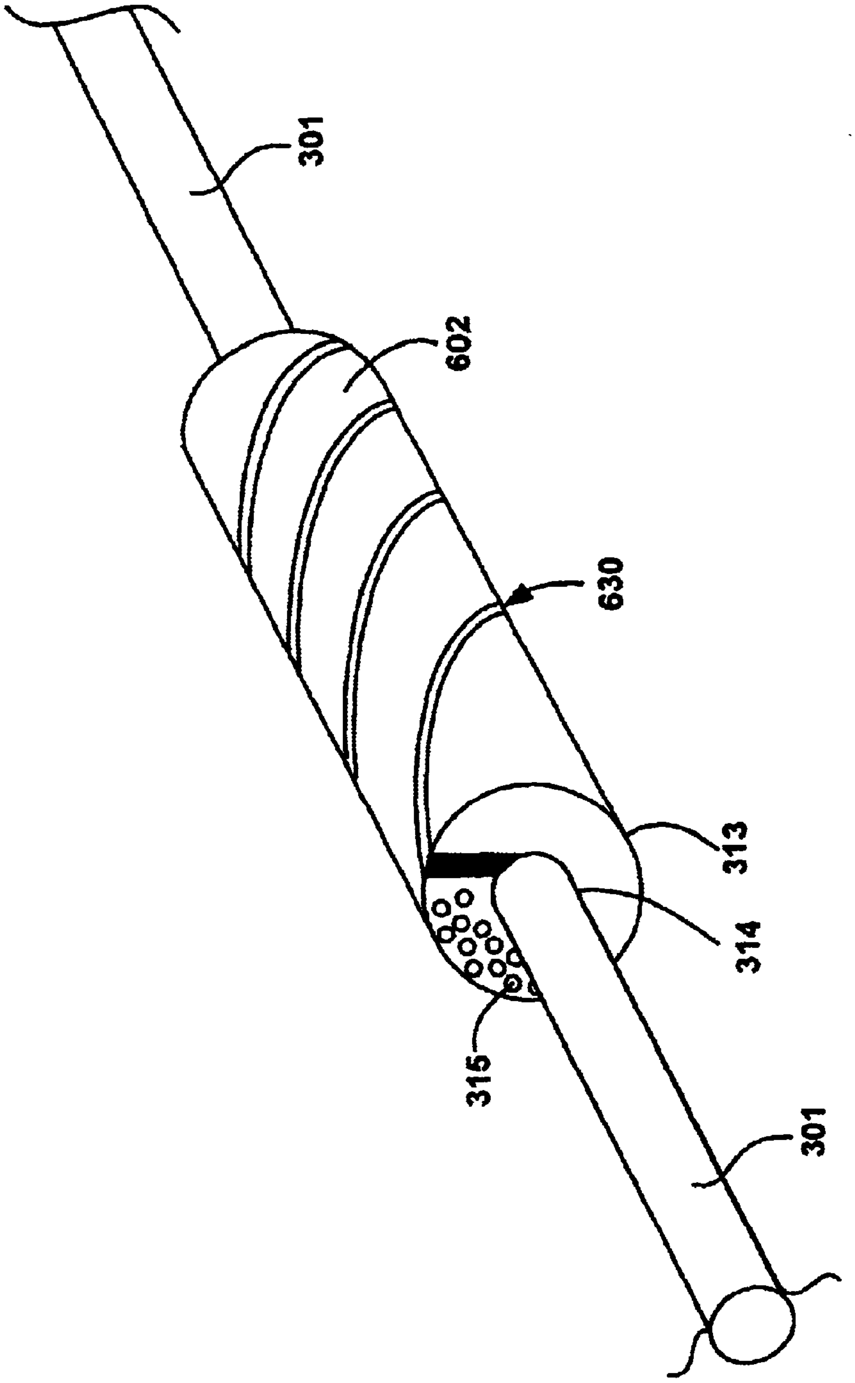
FIG. 6 depicts a unitary compressible cable sleeve with a spiral cut slit, in accordance with an embodiment of the present invention.

With reference to FIG. 6, a sleeve 602 bears a spiral slit 630 cut helically through outer jacket 313, foam 315, and inner jacket 314. Sleeve 602 is deployed about a cable 301.

Such cut sleeves 502 and 602, as depicted respectively in FIG. 5 and 6, ease installation of substantially foam filled sleeves onto a cable (e.g., cable 301; FIG. 6). In particular, ease of installation of sleeves 502 and 602 is realized on a cable to which terminations (e.g., terminator 305; FIGS. 3A, 3B, 3C) have already been installed.

Installation of such sleeves 302, 502, and 602 may be effectuated by different processes in various embodiments. One such process (e.g., process 800) is described in FIG. 8, below. In general, when a slit sleeve (e.g., sleeve 502, 602; FIGS. 5, 6, respectively) is used, the sleeve may be wrapped, in various embodiments, about a cable (e.g., cable 301; FIG. 6) to achieve a snug fit. The slit may then be glued, in one embodiment. In another embodiment, the slit may be self-adhesive, and close securely in that manner. In another embodiment, the sleeve may be secured by any thermosetting process, well known in the art. In one embodiment, an affixing mechanism 469 is effectuated by glue, thermosetting, complementary adhesion between said enclosure and said outer jacket, friction, resilient shape retention, and compression.

With reference again to FIGS. 3A, 3B, and 3C, system 300 routes, e.g., orients cable 301, enveloped over a part of its length by a sleeve 302 such that the sleeve 302 lies upon edges 309 of Olx dividers 308 (or in another embodiment, the edges of a PCI or other component card parallel to the Olx cards) within assembly 303. A top cover 319 is placed upon the top of the module 303 in which this portion of cable 301 runs through assemblage 304.

When top cover 319 is placed atop module 303, there is little clearance between the upper surface line of outer jacket 313 of sleeve 302 and top cover 319. In one embodiment, top cover 319, when secured into its position, as by screws, clips, bindings, etc., actually compresses sleeve 302 to some degree. In another embodiment, there is little or no actual compression of sleeve 302.

However, in either embodiment, when forces are applied to cable 301, such as by lateral acceleration due to movement, shock, vibration, and/or combinations of such circumstances, displacement of the cable 301 is advantageously deterred by frictional, compressive, and/or other restraining forces applied via the contiguity of the outer surface 313 of sleeve 302 with the edges 309 and/or top cover 319.

Deterring lateral displacement of cable 301 by system 300 in this manner greatly improves the security of the electromechanical coupling between terminating connector 305, at the end of cable 301, which in one embodiment may be an SCSI cable, and complementary receptacle 306 on PCI board 307. This increases the reliability of the electrical interconnection between connector 305 and receptacle 306, and thus, of the functionality of assemblage 304 as a whole.

Figure 7A:
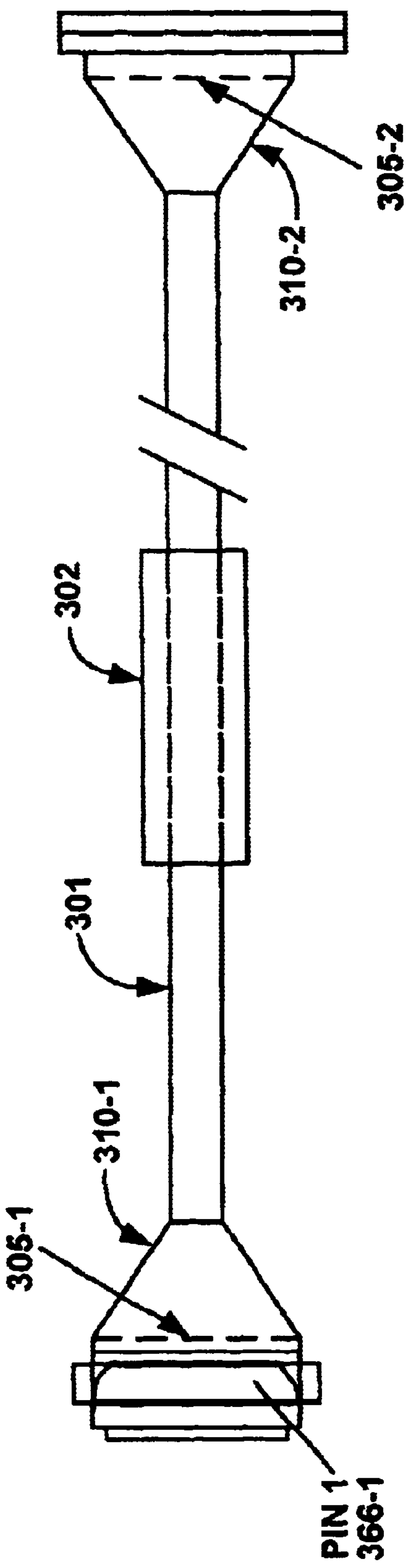
FIGS. 7A, 7B, and 7C are schematic diagrams of different perspectives of a sleeved SCSI cable assembly, in accordance with an embodiment of the present invention.
Figure 7B:
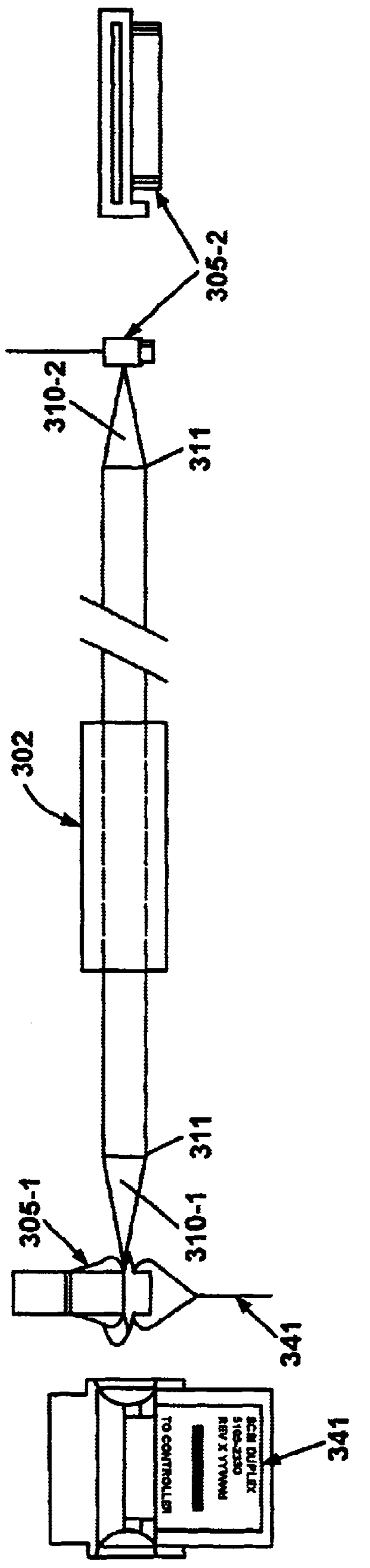
Figure 7C:
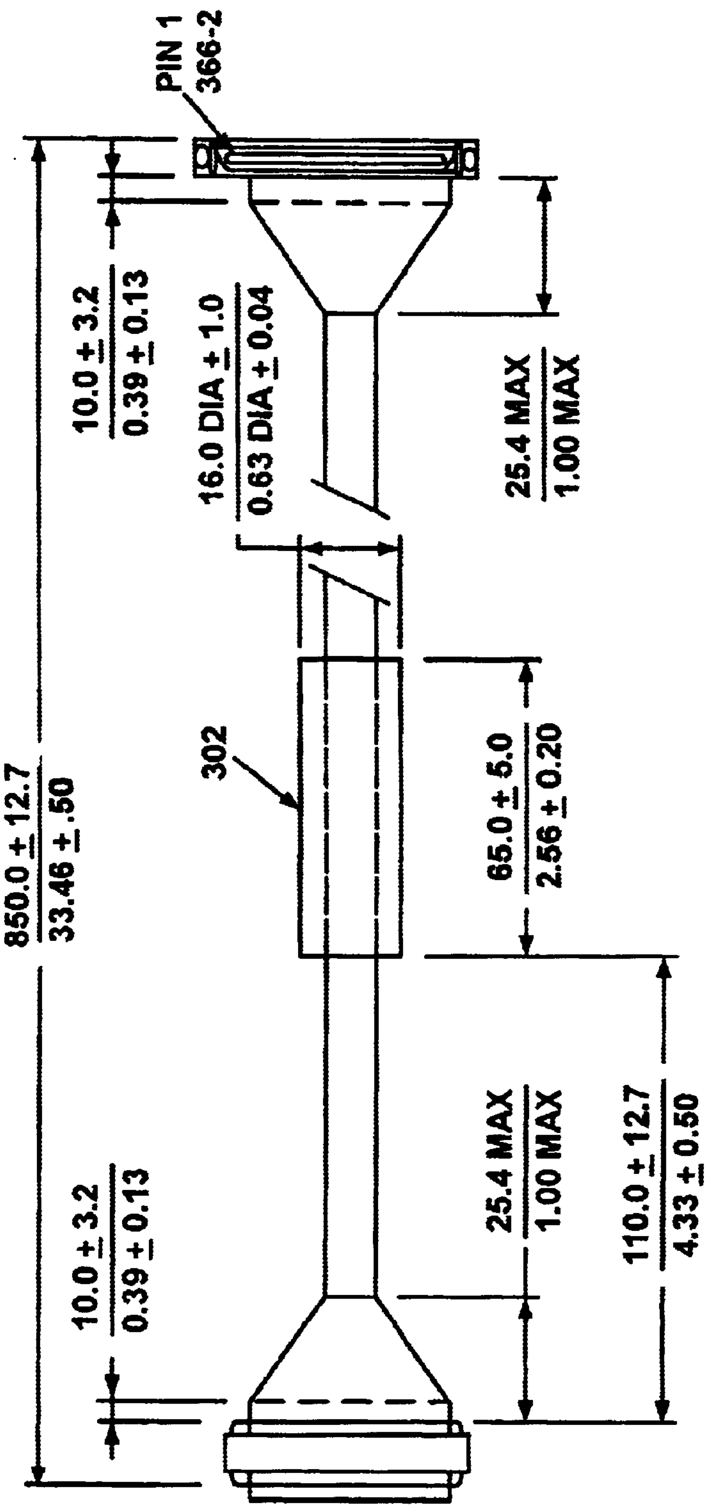

Referring now to FIG. 7, a small computer system interface (SCSI) cable 301 is depicted from different perspectives, according to an embodiment of the present invention.

A SCSI cable 301 has terminating connectors 310-1 and 310-2 at its opposite ends. Both connectors have electrical connectors therein exemplified by pins 366-1 and 366-2, at each opposing end. No mechanical locking hardware is installed thereon either. Terminal 305-1 at one end has a pull loop/label 341 installed.

A sleeve 302 envelopes the outer jacket 311 of SCSI cable 301. Individual conductors 310-1 and 310-2, at opposite ends of the cable, emerge from the outer jacket of SCSI cable 301 to terminators 305-1 and 305-2, respectively.

In the present embodiment, SCSI cable 301 is 850 mm long (±12.7 mm). Sleeve 302 is 65 mm (±5 mm) long. Conductor fanouts 310-1 and 310-2 are 25.4 mm long. Sleeve 302 is positioned 110 mm (±12.7 mm) from the end of SCSI cable 301 nearest to terminal 305-1, e.g., from the end of SCSI cable 301's outer jacket 311 on that end. Terminators 305-1 and 305-2 have a protuberance 373 of 10 mm (±3.2 mm) from the end of fanouts 310-1 and 310-2 to the terminator bodies 305-1 and 305-2 themselves. Although such specific dimensions are recited in the present embodiment, the present invention is well suited to be practiced with other dimensions.

In the present embodiment, SCSI cable 301 is a stranded cable conforming to UL standards for recognized appliance wiring such as VW-1 or better, and certified according to corresponding Canadian Safety Administration (CSA) standards. In one embodiment, insulating materials constituting insulation of SCSI cable 301 is polyvinyl chloride (PVC). In the present embodiment, no UL or CSA certifications are specified. In one embodiment, connectors 305-1 and 305-2 are UL recognized and CSA certified components, and are constituted of materials having flammability ratings meeting or exceeding UL 94V-2. It is appreciated that in other embodiments, ratings and specifications of SCSI cable 301 may vary.

SCSI cable 301 may be routed by a system (e.g., system 300; FIGS. 3A, 3B, 3C) such that displacement of the cable under conditions of movement, shock, and/or vibration is deterred.

With reference now to FIG. 8, the steps in a process 800 prepare a cable (e.g., cable 301; FIGS. 3A, 3B, 3C, 7A, 7B, 7C) for deterrence of displacement, in accordance with an embodiment of the present invention. Process 800 begins with step 801, wherein a cable, the displacement of which under movement, shock, and/or vibration conditions is to be deterred, is examined.

During the course of this examination, in step 802, it is determined whether terminating features (e.g., connectors 305; FIG. 3) are installed, in particular, at an end of the cable where displacement under movement, shock, and/or vibration conditions may be of especially serious concern, if any is more a more especially serious concern than the other.

If it is determined (in step 802) that terminating features are not installed on the cable, then in step 803, an unseparated enclosure, e.g., one with no slits, separated seams, etc. (such as sleeve 301; FIG. 4) is selected.

In step 804, this unseparated enclosure is slid or otherwise positioned onto the cable, enveloping a portion of its outer jacket (e.g., outer jacket 311; FIG. 3A).

At step 805, the enclosure is then affixed to the outer jacket, as by glue, thermosetting techniques, frictional coupling, etc.

Referring now to step 806, fixedness of the enclosure about the outer cable jacket is assured by testing,. This testing may be accomplished either manually, or by using any of several mechanical testing instrumentalities known in the art Then in step 807, terminating appurtenances are installed, and process 800 is complete.

If however, in step 802 it is determined that terminating appurtenances are installed on the cable, then in step 808, a separated enclosure, e.g., a slit one (e.g., slit sleeves 502, 602; FIGS. 5, 6, respectively) is selected.

After so selecting a slit enclosure (step 808) it is determined in step 809 whether a spiral slit (e.g., spiral slit 630; FIG. 6) or a straight slit (e.g., straight slit 529) enclosure is preferred.

Reasons for such preference may include personal preference, cost, availability, ease of installation, enclosure profile, affixing medium to be deployed, engineering specification, handiness, speed of application, etc.

If a spiral slit enclosure is determined preferable (step 809), one is selected in step 810.

If on the other hand a straight slit enclosure is preferable (step 809), one is selected in step 811.

In step 812, whichever slit design is selected, the enclosure is installed accordingly onto the cable outer jacket.

At this point, process 800 proceeds with step 813, wherein the enclosure is affixed to the cable jacket.

Process 800 proceeds then to completion upon testing to assure fixedness of the application in step 814.

With reference to FIG. 900, the steps in a process 900 effectuate the deterrence of displacement of a cable (e.g., cable 301; FIGS. 3A, 3B, 3C, 7A, 7B, 7C). This may, as discussed above, be a particularly advantageous outcome, especially where the cable may be subjected to shock, and/or vibration conditions.

Process 900 begins with step 901, wherein the outer jacket (e.g., outer jacket 31 1; FIG. 3A) of a cable is enveloped by an enclosure (e.g., sleeve 302; FIG. 3A). This may be effectuated, in one embodiment, by a enclosure attachment process such as described herein (e.g., process 800; FIG. 8).

In step 902, the cable is routed such that the enclosure abuts an edge (e.g., edges 309; FIG. 3A) of a divider, such as an insulating divider (e.g., Olx divider 302; FIG. 3A) or of a component such as an installed PCI board, or both.

In step 903, it is determined whether the cable runs between this edge/these edges and a cover (e.g., top cover 319; FIG. 3A). If not, process 900 is complete at this point.

If on the other hand, it is determined that the cable runs between edges and a cover, then the cover is placed in position over the cable enclosure; step 904.

In step 905, the cover is then attached in such a way that the enclosure is compressed, completing process 900. This may be accomplished by screws, clips, bindings, etc., and/or any other attachment medium. Many such attachment media are well known in the art.

Advantageously, the displacement of the cable is thus deterred by forces acting upon the enclosure and thereby restricting changes in its position. Such forces may be frictional, compressive, and/or a combination of both.

In summary, for a cable having an outer jacket, a method for deterring displacement of the cable is effectuated by enveloping the outer jacket by an enclosure and routing the cable such that the enclosure abuts the edges of a divider or a component.

An embodiment of the present invention, a method of deterring displacement of a cable, is thus described. While the present invention has been described in particular embodiments, it should be appreciated that the present invention should not be construed as limited by such embodiments, but rather construed according to the following claims and their equivalents.

What is claimed is:

1. A device for deterring displacement of a cable in an electronic assembly comprising:

an enclosure adapted to envelope said cable wherein said enclosure comprises an insulating material interrupted by a slit cut spirally through a longitudinal axis of its side and wherein said enclosure is installed to envelope said cable after a terminator has been installed thereon; and an affixing mechanism adapted to couple said enclosure to said cable, wherein said cable is oriented in said assembly such that said enclosure contacts a feature internal to said assembly and deters displacement of said cable, and wherein said feature comprises a component selected from the group consisting of a circuit board, an on line replacement (OLx) divider, and a cover of said assembly.

2. The device as recited in claim 1, wherein said enclosure comprises a compressible material.

3. The device as recited in claim 1, wherein said enclosure comprises a substantially cylindrical shape.

4. The device as recited in claim 1, wherein said enclosure envelopes said cable along a portion of a length of said cable, and cross-sectionally in a substantially annular aspect surrounding an outer circumference of said cable.

5. The device as recited in claim 4, wherein said enclosure is affixed to the outer circumference of said cable.

6. The device as recited in claim 1, wherein said affixing mechanism is selected from the group consisting of glue, thermosetting, complementary adhesion between said enclosure and an outer jacket of said cable, friction, resilient shape retention, and compression.

7. The device as recited in claim 1, wherein said enclosure comprises a material selected from the group consisting of urethane, neoprene, and silicone.

8. A method of deterring displacement of a cable in an electronic assembly comprising:

enveloping said cable with an enclosure, wherein said enclosure comprises an insulating material interrupted by a silt cut spirally through longitudinal axis of its slide and wherein said enclosure is installed to envelope said cable after a terminator has been installed thereon; and orienting said cable within said assembly such that said enclosure frictionally contacts a portion of a feature of said assembly proximate to said cable such that said cable is detained by said enclosure frictionally contacting said feature, and wherein said feature comprises a component selected from the group consisting of a circuit board, an on tine replacement (OLx) divider, and a cover of said assembly.

9. The method as recited in clam 8, wherein said enclosure is affixed to an outer jacket of said cable.

10. The method as recited in claim 8, wherein said enclosure comprises a compressible material.

11. The method as recited in claim 10, wherein said compressible material is selected from the group consisting of urethane, neoprene, and silicone.

12. The method as recited in claim 11, further comprising compressing said enclosure with said feature.

13. The method as recited in claim 12, wherein said compressing further comprises:

covering said cable with a cover; and securing said cover such that said enclosure is compressed between said feature and said cover.

14. A system for deterring displacement of a cable comprising:

means for enclosing an outer jacket of said cable wherein said enclosing means comprises an insulating material interrupted by a slit cut spirally through a longitudinal axis of its side and wherein said enclosing means is installed to envelope said cable after a terminator has been installed thereon; and means for contacting said enclosing means, wherein under conditions of movement said contacting means applies a force inhibitive of displacement of said cable.

15. The system as recited in claim 14 wherein said enclosing means is compressible.

16. The system as recited in claim 15, further comprising means for compressing said enclosing means.

17. The system as recited in claim 16, wherein said force inhibitive of displacement is selected from the group consisting of friction and compression.

* * * * *